July 17, 1928.
W. L. ROHRER
1,677,208
DASHBOARD TYPE HEAT INDICATOR
Filed Oct. 25, 1926   2 Sheets-Sheet 1
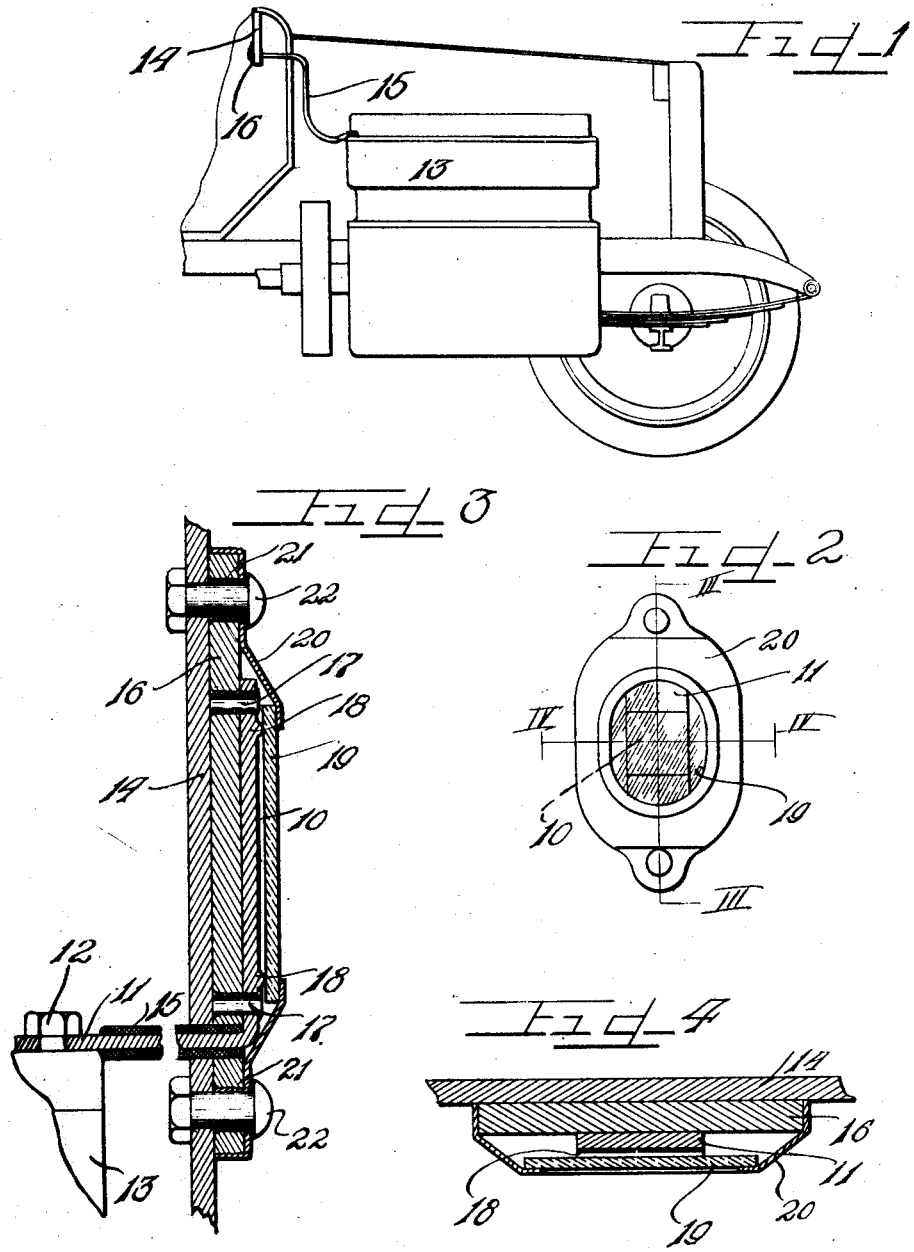

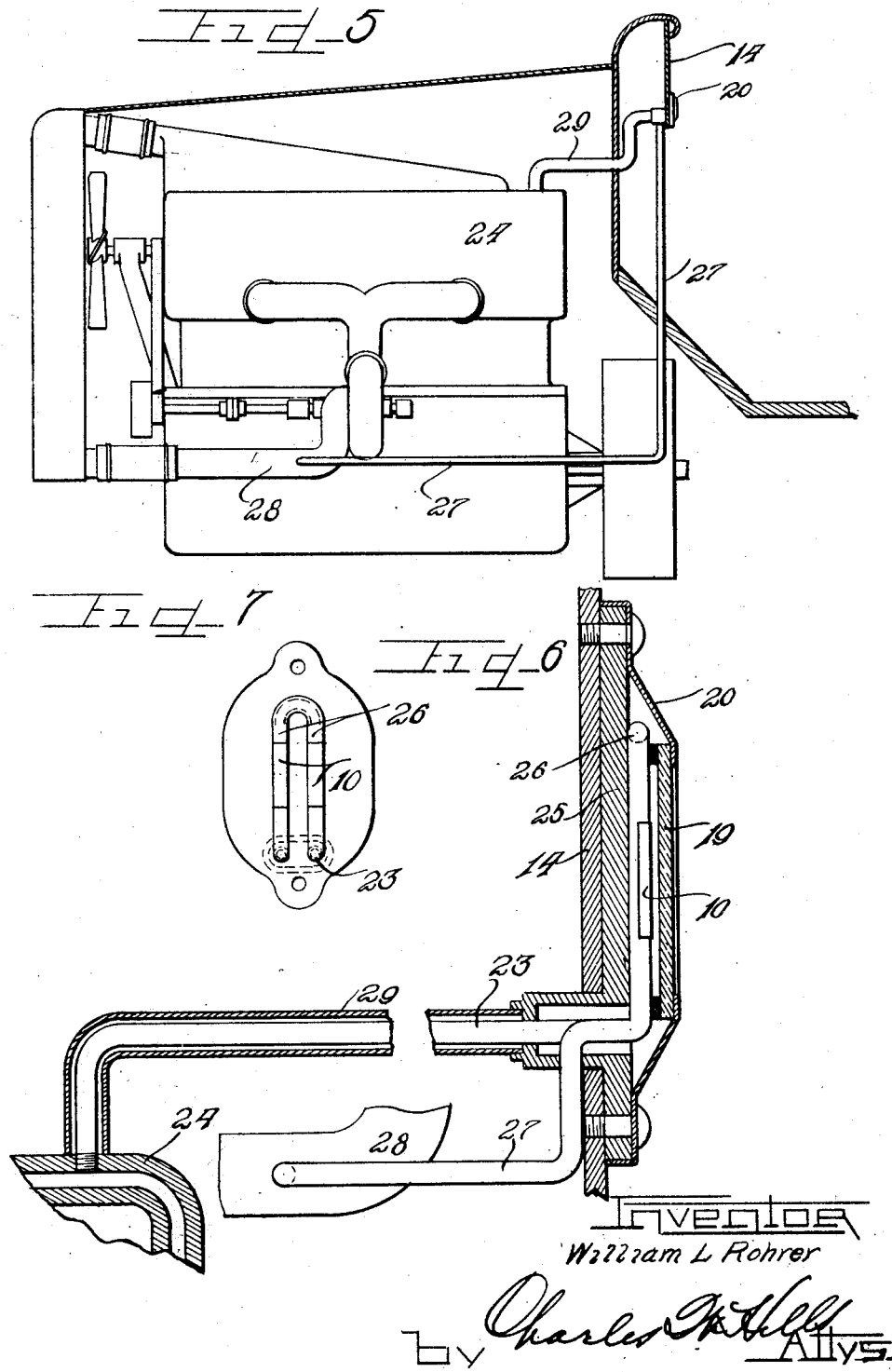

Patented July 17, 1928.

1,677,208

UNITED STATES PATENT OFFICE.

WILLIAM L. ROHRER, OF NEW YORK, N. Y.

DASHBOARD-TYPE HEAT INDICATOR.

Application filed October 25, 1926. Serial No. 143,950.

This invention relates to distant reading or dash board type engine heat indicators for indicating the operating temperatures of prime movers.

It is an object of this invention to utilize heat responsive color changing pigments to indicate the cylinder temperature of internal combustion engines at a distance therefrom. To accomplish this result, I use a heat conducting medium, which in itself has the property of smoothing out unimportant momentary engine temperature variations, to conduct the engine heat to a position on the dash of an automotive vehicle where the conductor may be coated with material which undergoes a marked change in color with a change in temperature. In a modified form, I accomplish the desired results in connection with a water cooling system by by-passing a portion of the hot jacket water through a tube mounted on the dash, the heat responsive material being applied to the visible portion of the tube.

Other and further important objects of this invention will be apparent from the disclosures in the specification and the accompanying drawings.

This invention, (in a preferred form) is illustrated in the drawings and hereinafter more fully described.

On the drawings:

Figure 1 is a fragmentary view of the power plant and dash board of an automotive vehicle having a device embodying the features of this invention applied thereto.

Figure 2 is a front view of the dash indicator.

Figure 3 is an enlarged section on the line III—III of Figure 2.

Figure 4 is an enlarged section on the line IV—IV of Figure 2.

Figure 5 is a view of a modified form of the device of this invention as applied to a power plant.

Figure 6 is a vertical section through the modified form of Figure 5.

Figure 7 is a front view of the modified form with the cover removed.

As shown on the drawings:

The temperature indicating material 10 may be a compound of mercuric and copper iodides, which changes from red to black when heated, or other known heat responsive compounds of this class, such as for instance, a compound of silver and mercuric iodides which changes from yellow to red upon a rise in temperature. Variations in the proportions or elements of the compounds may be made to provide a material changing color at different temperatures to make due allowance for the temperature gradient or drop along a long heat conductor.

In the form shown in Figures 1 to 4, a bar 11 of material such as copper or aluminum, having a high co-efficient of heat transmission, is affixed at one end as by clamping under a cylinder head bolt 12 of an engine 13 and extends to the front of the vehicle dash 14, being insulated by a covering 15.

An indicator base plate 16 is indicated, the strip or bar 11 being secured to this plate by eyelets 17. Ridges 18 are formed on this strip on either side of the applied heat indicating material 10, these ridges being used to hold a cover glass 19 clear thereof, the glass being held in place by a cover 20 secured to the base plate 16 by eyelets 21 through which bolts 22 may be inserted to hold the assembled instrument in place on the dash.

Because of the temperature gradient in the exposed heat indicator portion of the strip due to the inflow of heat from the strip, the color of the indicator material will first change at the bottom, shading off into the normal color at the top due to the cooling thereof. This shading of color is of considerable value as a color change at the bottom of the indicator presages normal warm operating conditions, while if the color change advances to the top, it indicates danger from overheating.

In the modified form of Figures 5 to 7, a water by-pass pipe 23 leads from a hot part of the engine jacket 24 and conducts the hot water to the dash board 14 where a base plate 25 is mounted in a manner substantially similar to the foregoing form. In the present form, the pipe 23 is looped at 26 underneath the glass 19 held by the cover 20, and a return pipe 27 leads to the pump suction pipe 28 of the engine to insure a circulation through the indicator. Heat indicating material 10 is applied to the visible portions of the loop 26.

In the modified form, the incoming hot water pipe 23 is jacketed as at 29 to prevent temperature drop, so that in the preparation of the heat indicating material, no allowance is necessary to provide for temperature gradient or drop between the engine and indicator. The indicator operates substantially as in the first case, except that momentary fluctuations of the temperatures are registered by the heat indicator, and it is necessary to watch the indicator more closely to be able to judge the importance of a sudden temperature rise.

I am aware that many changes may be made and numerous details of construction may be varied through a wide range without departing from the principles of this invention, and I therefore do not purpose limiting the patent granted hereon otherwise than necessitated by the scope of the appended claim.

I claim as my invention:

In a dashboard temperature indicator for internal combustion engines, a base plate, a heat-conducting member having ridges formed thereon, heat responsive paint on the member and between the ridges, a transparent plate engaging said ridges, and a cover housing the said transparent plate, said cover supporting the transparent plate in engaged relation with the ridges of the heat-conducting member.

In testimony whereof I have hereunto subscribed my name.

WILLIAM L. ROHRER.